United States Patent Office 3,637,537
Patented Jan. 25, 1972

3,637,537
PHOSPHORUS-CONTAINING NON-INFLAMMABLE POLYURETHANE FOAMS
Michel Buisson, Lavera, Gérard Repiquet, Martigues, and Camille Granger, Lavera, France, assignors to Naphtachimie, Paris, France
No Drawing. Filed Oct. 3, 1967, Ser. No. 672,430
Claims priority, application France, Oct. 25, 1966, 81,499
Int. Cl. C08g 22/44, 23/10
U.S. Cl. 260—2.5 AR
13 Claims

ABSTRACT OF THE DISCLOSURE

Non-inflammable polyurethanes having improved physical and chemical properties prepared by the reaction of a chlorochloroalkyl-phosphate with a primary or secondary amine in the presence of excess propylene oxide, separating lower boiling compounds from the reaction product and then reacting the reaction product with an organic polyisocyanate alone or in combination with an organic polyhydroxylated compound which does not contain phosphorus to produce a polyurethane.

---

This invention relates to non-inflammable phosphorus polyurethanes.

Extensive research has been conducted towards the manufacture of polyurethanes which might find use in applications where fire constitutes a danger.

In order to reduce the inflammability of foamed polyurethanes, certain fire resisting phosphorus containing compounds, with or without chlorine atoms, such as trichloroethylphosphate, have been added. However, these c mpounds often have the disadvantage of presenting a mediocre degree of compatibility with others of the components employed in the fabrication of the polyurethane foam. Since they are not chemically combined in the polymer, they are subject to volatilization with the result that the flame resisting properties of the plastic materially decrease with time. Finally, such additional phosphorus compounds are occasionally used as plasticizers and bring about deterioration of the mechanical properties of the polyurethanes.

It is also known to prepare polyurethanes containing phosphorus in chemical combination from organic polyisocyanates and polyalkylenepolyols produced by condensing alkylene oxide and an acid containing phosphorus such as phosphorus or phosphoric acids. These phosphorus containing polyalkylenepolyols have the disadvantage of being easily hydrolyzable with the result that such polyurethane foams deteriorate in the presence of water or high humidity.

It has been found that non-inflammable polyurethanes which retain their properties in the presence of water can be prepared by reaction of phosphorus compounds containing functional groups with organic polyisocyanates, in which the phosphorus compound, provided by the reaction of a chlorochloroalkylphosphate with primary or secondary amines which contain one or more other functional groups that can react with the organic polyisocyanates.

Thus it is an object of this invention to provide a process for preparing non-inflammable polyurethanes comprising in a first stage the preparation of a compound containing phosphorus by vacuum distillation of the product obtained from the reaction of a chloro-chloroalkyl-phosphate having an average of from 0.5 to 2.5 chlorine atoms per molecule which are directly joined to a phosphorus atom, and a primary or secondary amine having one or more functions which can react with organic polyisocyanates at a temperature within the range of 0° C. to 100° C. in the presence of an excess of propylene oxide as a hydrochloric acid acceptor. The number of molecules of amine employed is substantially equal to the number of chlorine atoms in the chloro-chloroalkyl-phosphate and directly joined to the phosphorus atoms. In a second stage reaction, the process comprises the preparation of polyurethanes from the aforementioned phosphorus compound and organic polyisocyanates in which the materials may be mixed with an organic polyhydroxylated compound which does not contain phosphorus.

It is an object of this invention to produce and to provide a method for producing a new industrial product in the form of a non-inflammable phosphorus containing polyurethane.

In accordance with the practice of this invention, the chloro-chloroalkyl-phosphates can be obtained by reacting phosphorus oxychloride and ethylene oxide and/or propylene oxide at a temperature within the range of 0° C. to 100° C. in the presence of a catalyst, such as pyridine or phosphorus trichloride. The number of molecules of ethylene oxide and/or propylene oxide which react with one molecule of phosphorus oxychloride may range from 0.5 to 2.5.

The primary or secondary amines which contain one or more other functions that can react with organic isocyanates can be represented by the mono-alkanolamines or di-alkanolamines such as mono-ethanolamine or di-ethanolamine, mono-propanolamine or di-propanolamine, or di-primary or di-secondary di-amines such as ethylene diamine or diethylene diamine or mixtures thereof.

The reaction of the chloro-chloroalkyl-phosphate and the primary or secondary amine may be effected in a reactor provided with an agitator, as well as with heating and cooling means, under atmospheric pressure at a temperature within the range of 0° to 100° C. and preferably within the range of 30° to 50° C. The hydrochloric acid that is formed in the course of the reaction reacts on propylene oxide to produce propyleneglycol chlorohydrin. The excess propylene oxide and the propylene-glycol chlorohydrin can subsequently easily be eliminated from the reaction product by distillation under vacuum at a temperature which may rise as high as 100° C.

The phosphorus compounds produced are viscous liquids, generally amber in color and difficult to hydrolyze. By reaction with organic polyisocyanates, non-inflammable polyurethanes having good mechanical properties are produced. They may be fabricated alone or in the form of a mixture with polyhydroxylated compounds that do not contain phosphorus, such as polyesters or polyethers having at least two hydroxyl groups per molecule. As the polyether, use can be made of products formed of the reaction of propylene oxide and a polyol having a molecular weight of from 500 to 6000.

The organic polyisocyanates currently employed in the manufacture of polyurethanes may equally be employed in the manufacture of the polyurethanes of this invention. For example, toluene diisocyanate, diphenylmethane diisocyanate and polymethylene polyphenylisocyanate (PAPI) are particularly suitable.

In the case of the manufacture of cellular polyurethanes, the various techniques known to the skilled in the art, such as the so-called quasi-prepolymer technique or the single stage technique may be used. Either water or a halogenated hydrocarbon, such as trichloromonofluoromethane, may be used as the foaming agent. It is generally advantageous to include a tensio-active agent or surface active agent, such as a silicone oil and a catalyst which may be selected from the tertiary amines or certain compounds of tin.

Thus, in accordance with the practice of this invention, rigid polyurethane foams are produced of very high

EXAMPLE 1

(a) Preparation of the compound containing phosphorus

Into a reactor provided with an agitator and with means for heating and cooling, 614 parts by weight of phosphorus oxychloride and 3 parts by weight of pyridine are introduced. 370 parts by weight of ethylene oxide are then added dropwise while maintaining the reaction temperature between 30° and 40° C.

200 parts by weight of propylene oxide and 315 parts by weight of diethanolamine are added successively to 724 parts by weight of the condensate retained in the reactor while the reaction temperature is maintained between 10° and 30° C. The temperature is then raised to approximately 40° C. for 2 hours and then to 70° C. for another 2 hours in order to complete the reaction.

The product obtained is subsequently distilled under 10 mm. of mercury up to a temperature of 90° C. to eliminate the lower boiling compounds contained therein.

945 parts by weight of the phosphorus containing polyol are thus obtained having the following characteristics:

Aspect: light chestnut-colored liquid
Water content: 0.03% by weight
Viscosity at 100° C.: 88 centistokes (b) Preparation of a rigid polyurethane foam The following ingredients are mixed together:

| | Parts by wt. |
|---|---|
| Polyol of Example 1(a) | 25 |
| Polyether polyol, having a hydroxyl index of 420, produced by condensing propylene oxide and sorbitol | 75 |
| Dimethyl ethanolamine | 2 |
| Triethylene diamine | 0.5 |
| Silicone oil | 1.5 |
| Trichloromonofluoromethane | 35 |
| Dibutyl dilaurate of tin | 0.3 |

The mixture is added with vigorous agitation to 105 parts by weight of polymethylene polyphenylisocyanate (PAPI). As soon as foaming appears, the mixture is poured into an open mold.

A rigid foam is obtained having a density of 35 kg./m.³ which is non-inflammable as determined by the standard ASTM D1 692–52T ($t1$=60 secs. $t2$ nil, burnt length nil).

EXAMPLE 2

(a) Preparation of the compound containing phosphorus 724 parts by weight of the condensate of ethylene oxide and phosphorus oxychloride prepared as in Example 1 are introduced into the reactor of Example 1. 183 parts by weight of monoethanolamine and 200 parts by weight of propylene oxide are added simultaneously at a rate to maintain the temperature between 40° and 50° C. and to complete the addition of the two ingredients at the same time.

When the addition of these two ingredients has been completed, the temperature is maintained at 50° C. for 2 hours and then at 70° C. for more hours. The product is distilled at 80° C. under 10 mm. of mercury.

The resulting phosphorus polyol has the following characteristics:

| | |
|---|---|
| pH in methanolic solution | 6.9 |
| Viscosity at 100° C. (centistokes) | 141.5 |
| Hydroxide index measured by phthalation | 190 |

(b) Preparation of a rigid polyurethane foam

The following ingredients are mixed together:

| | Parts by wt. |
|---|---|
| Phosphorus polyol of Example 2(a) | 25 |
| Polyether polyol having a hydroxyl index of 420 obtained by reacting propylene oxide and a mixture of monoethylene glycol, monoethylene glycol glucoside and non-reducing agent diholoside, known under the commercial name of "Napiol Z 800" | 75 |
| Dimethyl ethanolamine | 2 |
| Triethylene diamine | 0.5 |
| Silicone oil | 1.5 |
| Trichloromonofluoromethane | 33 |
| Dibutyl dilaurate of tin | 0.3 |

This mixture is added with vigorous agitation to 105 parts by weight of polymethylene polyphenylisocyante (PAPI). As soon as foaming appears, the entire mixture is poured into an open mold. A rigid polyurethane foam is obtained having a density equal to 33 kg./m.³ and which is non-inflammable according to the standard ASTM D1 692–59T ($t1$=60 secs., $t2$ nil, burnt length nil).

It will be apparent from the foregoing that there is provided a new and improved non-inflammable polyurethane resinous and foamed product which retains the desirable physical and mechanical properties of the polyurethane resins and foamed materials.

It will be understood that changes may be made in the details of formulation and processing without departing from the spirit of the invention, especially as defined in the following claims.

We claim:

1. A process for preparing non-inflammable polyurethanes comprising the steps of forming a first reaction mixture comprising a chloro-chloroalkyl-phosphate having an average of 0.5 to 2.5 chlorine atoms per molecule directly joined to a phosphorus atom and an amine selected from the group consisting of mono- and di-alkanol amines and primary and secondary diamines, reacting said first reaction mixture in the presence of excess propylene oxide at a temperature within the range of 0 to 100° C., separating the phosphorus-containing compound from lower boiling compounds, forming a second reaction mixture comprising said phosphorus containing compound and an organic isocyanate and reacting said second reaction mixture to produce a non-inflammable polyurethane.

2. The process as claimed in claim 1 in which the excess propylene oxide functions as an acceptor for the hydrochloric acid given off during the first reaction.

3. The process as claimed in claim 1 in which an organic hydroxylated compound which does not contain phosphorus is provided in the second reaction mixture of the organic isocyanate and the phosphorus containing compound to form the polyurethane.

4. The process as claimed in claim 1 in which the chloro-chloroalkyl-phosphate is produced by reacting phosphorus oxychloride with a compound selected from the group consisting of ethylene oxide, propylene oxide and mixtures thereof at a temperature within the range of 0° to 100° C. in the presence of a catalyst.

5. The process as claimed in claim 4 in which the catalyst is pyridine.

6. The process as claimed in claim 4 in which the catalyst is phosphorus trichloride.

7. The process as claimed in claim 4 in which the materials are reacted in the ratio of 1 mole phosphorus oxychloride to 0.5 to 2.5 moles of the oxide.

8. The process as claimed in claim 3 in which the polyhydroxylated organic compound which does not contain phosphorus and comprises the product of the reaction of propylene oxide and a polyol having a molecular weight within the range of 500 to 6000.

9. The process as claimed in claim 1 which includes a foaming agent in the second reaction mixture in the form of water or a halogenated hydrocarbon.

10. The process as claimed in claim 9 in which the foaming agent is trichloromonofluoromethane.

11. The process as claimed in claim 1 in which the mixture to form the foamed polyurethane includes a surface active agent.

12. The process as claimed in claim 1 in which the mixture to form the foamed polyurethane contains a catalyst selected from the group consisting of a tertiary amine and an organic tin compound.

13. A foamed non-inflammable polyurethane produced by the process of claim 1.

References Cited

UNITED STATES PATENTS

| | | | |
|---|---|---|---|
| 3,256,249 | 6/1966 | Vogt et al. | 260—77.5 |
| 3,407,150 | 10/1968 | Wismer et al. | 260—2.5 |

OTHER REFERENCES

Van Wazer—Phosphorus and Its Compounds, vol. I, Interscience, New York (1958), Call No. QD181.P1.

Gefter—Organophosphorus Monomers and Polymers Assoc. Tech. Services, Glen Ridge (1962), Call No. QD412.PE.64.

Hudson—Structure and Mechanism in Org. Phos. Chem. Academic Press, New York (1965), Call No. QD412-P1.H8.

Houben—Weyl: Methoden der Organischen Chemie, vol. 12, part 2 (1964), page 282.

Condensed Chemical Dictionary—1966 edition, Reinhold (New York), page 395.

DONALD E. CZAJA, Primary Examiner

H. S. COCKERAM, Assistant Examiner

U.S. Cl. X.R.

260—77.5 AR 945, 953